United States Patent
Kutsukake et al.

(10) Patent No.: US 7,572,513 B2
(45) Date of Patent: Aug. 11, 2009

(54) LENS AND METHOD OF MANUFACTURING LENS

(75) Inventors: Yusuke Kutsukake, Mizowa machi (JP); Jun Kinoshita, Ima (JP)

(73) Assignee: Seiko Epson Corporation, Tokyo (JP)

( * ) Notice: Subject to any disclaimer, the term of this patent is extended or adjusted under 35 U.S.C. 154(b) by 327 days.

(21) Appl. No.: 11/246,631

(22) Filed: Oct. 11, 2005

(65) Prior Publication Data

US 2006/0078723 A1    Apr. 13, 2006

(30) Foreign Application Priority Data

Oct. 12, 2004  (JP)  ............... 2004-297211
Jun. 21, 2005  (JP)  ............... 2005-180204

(51) Int. Cl.
  *B32B 9/04*   (2006.01)
  *B05D 5/06*   (2006.01)
  *B32B 5/18*   (2006.01)
  *G11B 5/706*  (2006.01)

(52) U.S. Cl. .............. 428/446; 428/847; 428/204; 427/169

(58) Field of Classification Search .............. 427/160, 427/164, 307, 322, 412.4, 412.5, 412.1, 162, 427/165, 169; 351/166; 428/1.32, 204, 432, 428/446, 447, 846.3, 847.4
See application file for complete search history.

(56) References Cited

U.S. PATENT DOCUMENTS

| | | | | |
|---|---|---|---|---|
| 4,611,892 A | * | 9/1986 | Kawashima et al. | ........ 351/159 |
| 5,116,644 A | * | 5/1992 | Asai et al. | .................. 427/164 |
| 5,173,368 A | * | 12/1992 | Belmares | .................. 428/426 |
| 5,462,806 A | * | 10/1995 | Konishi et al. | .............. 428/451 |
| 5,587,835 A | | 12/1996 | Shimizu et al. | |
| 5,945,209 A | | 8/1999 | Okazali et al. | |
| 6,051,310 A | * | 4/2000 | Cano et al. | .................. 428/336 |
| 6,319,594 B1 | | 11/2001 | Suzuki et al. | |
| 6,632,535 B1 | | 10/2003 | Buazza et al. | |
| 6,680,125 B1 | | 1/2004 | Sasaki | |
| 6,777,070 B1 | | 8/2004 | Murata et al. | |
| 7,014,912 B2 | | 3/2006 | Suzuki et al. | |

(Continued)

FOREIGN PATENT DOCUMENTS

JP    11-310755 A    11/1999

(Continued)

OTHER PUBLICATIONS

Biswas et. al. "Porous anti-reflective silica coatings with a high spectral coverage by sol-gel spin coating technique" Journal of Materials Science Letters, vol. 22, 2003, pp. 181-183.*

(Continued)

*Primary Examiner*—Timothy M Speer
*Assistant Examiner*—Lauren Robinson
(74) *Attorney, Agent, or Firm*—Sughrue Mion, PLLC

(57) ABSTRACT

A lens including a lens base material, a hard coat layer that is laminated on the lens base material directly or via a primer layer and includes a metal oxide fine particle, an organic silicon compound and a polyfunctional epoxy compound as principal components, and an antireflection layer that is laminated on the hard coat layer and includes a porous silica fine particle and a second organic silicon compound as principal components.

5 Claims, 1 Drawing Sheet

| | Dyeing affinity | Heat resistance | Antireflection effect | Adhesiveness | Abrasion resistance |
|---|---|---|---|---|---|
| Example 1 | A | A | A | A | A |
| Example 2 | A | A | A | A | A |
| Example 3 | A | A | A | A | A |
| Example 4 | A | A | A | A | A |
| Example 5 | A | A | A | A | A |
| Example 6 | A | A | A | A | A |
| Comparative Example 1 | D | A | B | A | A |
| Comparative Example 2 | D | A | A | B | A |

U.S. PATENT DOCUMENTS

| | | |
|---|---|---|
| 2002/0018886 A1 | 2/2002 | Matsufuji et al. |
| 2003/0096102 A1 | 5/2003 | Yoshihara et al. |
| 2003/0202137 A1 | 10/2003 | Nakamura et al. |

FOREIGN PATENT DOCUMENTS

| | | | |
|---|---|---|---|
| JP | 2001-166104 | | 6/2001 |
| JP | 2001-233611 | A | 8/2001 |
| JP | 2001-295185 | A | 10/2001 |
| JP | 2001295185 | | 10/2001 |
| JP | 2002-277604 | * | 9/2002 |
| JP | 2003-202406 | A | 7/2003 |
| JP | 2003-222703 | A | 8/2003 |
| JP | 2004-264778 | A | 9/2004 |
| JP | 2005-043572 | A | 2/2005 |
| KR | 1999-77978 | A | 10/1999 |
| WO | WO 99/57212 | A1 | 11/1999 |

OTHER PUBLICATIONS

Global b2b Network (http://www.global-b2b-network.com/b2b/98/99/572/343476/titanium_dioxide_rutile.html).*

Jap trans.*

* cited by examiner

FIG.1

|  | Dyeing affinity | Heat resistance | Antireflection effect | Adhesiveness | Abrasion resistance |
|---|---|---|---|---|---|
| Example 1 | A | A | A | A | A |
| Example 2 | A | A | A | A | A |
| Example 3 | A | A | A | A | A |
| Example 4 | A | A | A | A | A |
| Example 5 | A | A | A | A | A |
| Example 6 | A | A | A | A | A |
| Comparative Example 1 | D | A | B | A | A |
| Comparative Example 2 | D | A | A | B | A |

LENS AND METHOD OF MANUFACTURING LENS

The present invention relates to dyeing of a plastic or glass lens for use in spectacles and the like.

Some of colored spectacle lenses such as sunglasses and lenses for vision correction include a dyed base material, or a dyed plastic or glass lens that constitutes the substrate. Additionally, in place of dyeing the lens, dyeing of a functional layer that is laminated on the substrate, for example, a hard coat layer, has been studied. Lenses having a functional layer to be dyed can be colorized without affecting the lens substrate, and adjustment of the density is also possible. Thus, in response to user's requests, spectacle lenses with a wide variety of colors can be provided.

JP-A-2001-295185 discloses a method comprising forming a dye layer on a plastic lens base material, providing a hard coat layer on the dye layer, and dyeing (i.e., colorizing) the dye layer through the hard coat layer. This method is excellent in terms of capability of dyeing after forming a hard coat layer, and allows the dyed lens to be kept in stock in the stage of film formation to give the hard coat layer, thereby enabling making shipment after colorizing to meet the wishes of the user.

However, most of spectacle lenses are manufactured by forming a film of an antireflection coating with low power to overlay the hard coat layer. Furthermore, there are many cases in which a water repellent coating is formed to overlay an antireflection coating for the purpose of antifouling. Therefore, when any problem occurs during film formation of these layers after dyeing, steps of dyeing and film formation must be performed over again using another stock item. Alternatively, it is necessary to remove all layers on the lens substrate including the dye layer, thereafter form the dye layer and the hard coat layer again, and perform the steps following the dyeing once again. Hence, yield in steps of formation of the antireflection coating and the water repellent coating greatly influences the delivery schedule and the product cost.

There is a greater demand for undyed lenses than for dyed lenses. Therefore, techniques and know-how in connection with manufacture of lenses have been established mainly on undyed lenses. For manufacturing an undyed lens, a step for film formation of a hard coat layer is followed by a step for film formation of multilayer coatings performed to laminate an antireflection coating on the hard coat layer. On the other hand, for manufacture of a dyed lens by the technique disclosed in JP-A-2001-295185, a dyeing step of dipping in a disperse dye is performed after a step for film formation of a hard coat layer, and thereafter, a step for film formation of an antireflection coating is performed on the dyed lens by vapor deposition and the like. Therefore, it is necessary to further establish a technique for film formation of the antireflection coating on the dyed work.

In other words, techniques and know-how for film formation of an antireflection coating on a dyed lens with a high yield are required to be newly accumulated. Thus, techniques and know-how for film formation in lens without need of dyeing can not be perfectly applied to manufacture of the lens to be dyed. Therefore, there is a need for more efficient production techniques and know-how.

SUMMARY OF THE INVENTION

An advantage of the invention is to provide a lens and a method of manufacturing the same in which techniques for producing an undyed lens can be more effectively exploited. In addition, further advantage of the invention is to provide a lens and a method of manufacturing the same to enable supply of lenses colorized to have a color desired by the user to meet quick delivery schedule at low cost.

In order to achieve the above and other objects, a first aspect of the invention provides a lens comprising:
a lens base material,
a hard coat layer that is laminated on the lens base material directly or via a primer layer and includes a metal oxide fine particle, an organic silicon compound and a polyfunctional epoxy compound, and
an antireflection layer that is laminated on the hard coat layer and includes a porous silica fine particle and a second organic silicon compound.

A second aspect of the invention provides a lens comprising:
a lens base material,
a dyeable hard coat layer laminated on the lens base material directly or via a primer layer, and a porous antireflection layer laminated on the hard coat layer,
said dyeable hard coat layer being dyeable via the porous antireflection layer.

A third aspect of the invention provides a lens comprising:
a lens base material,
a dyeable hard coat layer laminated on the lens base material directly or via a primer layer,
a porous antireflection layer laminated on the dyeable hard coat layer, and
a water repellent layer laminated on the porous antireflection layer,
said dyeable hard coat layer being dyeable via the porous antireflection layer and the water repellent layer.

A fourth aspect of the invention provides a lens comprising:
a lens base material,
a dyed hard coat layer laminated on the lens base material directly or via a primer layer, and
a porous antireflection layer laminated on the hard coat layer,
said dyed hard coat layer being dyed via the antireflection layer.

A fifth aspect of the invention provides a method of manufacturing a lens comprising:
forming a dyeable hard coat layer on a lens base material directly or via a primer layer,
forming a porous antireflection layer on the dyeable hard coat layer by a wet process, and
dyeing the dyeable hard coat layer.

A sixth aspect of the invention provides a method of manufacturing a lens comprising:
laminating a dyeable hard coat layer on a lens base material directly, or via a primer layer, and
dyeing a lens having a porous antireflection layer laminated on the dyeable hard coat layer.

BRIEF DESCRIPTION OF THE DRAWINGS

FIG. 1 shows the evaluation results of the lenses manufactured according to Examples and Comparative Examples.

A lens according to an aspect of the present invention comprises a lens base material, a hard coat layer that is laminated on the lens base material directly or via a primer layer and includes a metal oxide fine particle, an organic silicon compound and a polyfunctional epoxy compound as a principal component, and an antireflection layer that is laminated on the hard coat layer and includes a porous silica fine particle and a second organic silicon compound as principal components.

In the lens according to this aspect of the invention, the hard coat layer is a dyeable hard coat layer, and the antireflection layer is porous. Therefore, the hard coat layer can be dyed via the antireflection layer by dipping the lens having the thus formed hard coat layer and antireflection layer in a disperse dye. Moreover, in the lens according to an aspect of the invention, the hard coat layer can be dyed also via the a water repellent layer.

A lens according to another aspect of the invention is a lens comprising a lens base material, a dyeable hard coat layer laminated on the lens base material directly or via a primer layer, and a porous antireflection layer laminated on the hard coat layer. The hard coat layer is dyeable via the antireflection layer.

According to this aspect of the invention, the lens is a dyeable lens, and can be manufactured by successively performing the steps including the manufacture of the antireflection layer without performing a dyeing step. Therefore, the lens can be kept in stock after perfecting the state without dyeing of the lens, in the same manufacturing process as that of the undyed lenses, while leaving the step for dyeing. Thereafter, the lens kept in stock can be dyed. Hence, manufacture until the state prior to dyeing can be carried out by almost the same process as that of undyed lens. Thus, manufacturing techniques of undyed lenses can be effectively exploited for manufacturing the dyeable lens according to an aspect of the present application. Therefore, a dyeable lens can be manufactured in a high yield and at low cost.

A lens according to a further aspect of the invention is a lens comprising a lens base material, a dyeable hard coat layer laminated on the lens base material directly or via a primer layer, a porous antireflection layer laminated on the hard coat layer, and a water repellent layer laminated on the antireflection layer. The hard coat layer is dyeable via the antireflection layer and the water repellent layer.

According to the experiment by present inventors, the water repellent layer scarcely affects dyeing properties. Even though a water repellent layer is overlaid on a porous antireflection layer, the hard coat layer can be dyed similarly to the lens not having a water repellent layer. Although this lens is a dyeable lens, the step for film formation of the water repellent layer in addition to the step for film formation of the antireflection layer can be performed prior to performing the dyeing step. That is, the steps for film formation of the hard coat layer to the water repellent layer can be successively performed without interposing the dyeing step. This process is the same as that for undyed lenses, and dyeing can be carried out after perfecting a lens having a water repellent layer and keeping in stock. Hence, also in the process for manufacturing a dyeable lens having a water repellent layer, manufacturing techniques of undyed lenses can be effectively exploited. Therefore, a dyeable lens having a water repellent layer can be manufactured in a high yield and at low cost.

According to a further aspect of the invention, the dyed lens comprises a lens base material, a dyed hard coat layer laminated on the lens base material directly or via a primer layer, and a porous antireflection layer laminated on the hard coat layer. The hard coat layer is dyed via the antireflection layer.

In accordance with the embodiment of the invention, the dyed lens can be shipped immediately after subjecting the lens kept in stock to dyeing. Therefore, lenses having a color desired by the user can be provided to meet quick delivery schedule. Further, the lens can be dyed as long as there is a technique or a device for dyeing, and thereafter, can be provided to the user. Therefore, the lens according to the invention can be dyed to have a color that meets user's request in a distributor or a dealer who may not be the manufacturer of the lens. Accordingly, a dyed lens can be provided.

It is preferable that the hard coat layer of the lens in accordance with an embodiment of the invention includes rutile type titanium oxide as the metal oxide fine particle. The rutile type titanium oxide has so high power that it is excellent as a component of the hard coat layer on which an organic antireflection coating is laminated. Also, the rutile type titanium oxide has a low photocatalytic activity Therefore, the hard coat layer including rutile type titanium oxide has favorable dyeing properties and high durability.

A method of manufacturing a lens according to a still further aspect of the invention comprises forming a dyeable hard coat layer on a lens base material directly, or via a primer layer, forming a porous antireflection layer on the hard coat layer by a wet process, and dyeing the hard coat layer.

In the manufacturing method, the dyeing step can be separated or spun off from a series of steps for film formation of functional layers in connection with the lens body. Therefore, a series of steps for film formation of an antireflection layer, still more, a water repellent layer can be performed in the same or similar process to that for undyed lenses. Accordingly, manufacturing techniques that have been accumulated for undyed lenses or that will be developed hereafter can be sufficiently exploited.

A method of manufacturing a lens according to yet another aspect of the invention comprises laminating a dyeable hard coat layer on a lens base material directly, or via a primer layer, and dyeing a lens having a porous antireflection layer laminated on the hard coat layer.

This manufacturing method has a step for dyeing a lens having a structure relating to fundamental functions of the lens, i.e., a lens after film formation of various functional layers. Therefore, the lens before dyeing that is in storage, stock or distribution can be dyed at any appropriate place by any appropriate person, for example, the dealer or the user him(her)self to have a color that meets user's request.

Thus, in accordance with the invention, dyed lens can be manufactured through taking full advantage of manufacturing techniques of the undyed lenses. Therefore, a dyed lens can be manufactured in a high yield and at low cost. In addition, no step for film formation is involved after the dyeing step, therefore, the dyed lens can be shipped in a short time period. Therefore, time period required from an order after decision of a color, to delivery of the dyed lens can be greatly shortened. Moreover, the step for dyeing can be performed immediately before or during distribution of the lens, therefore, the amount of stock can be diminished. In addition, because the dyeing can be carried out also in the shop, sale after dyeing the stock in the shop can achieve provision with quick delivery schedule which was impossible heretofore.

It is preferable that the hard coat layer of the lens in accordance with the invention includes a metal oxide fine particle, an organic silicon compound and a polyfunctional epoxy compound as a principal components. It is preferable that the antireflection layer includes a porous silica fine particle and a second organic silicon compound as principal components.

In other words, it is preferable that the hard coat layer of the lens in accordance with the invention is hard and resistant to scratches. Furthermore, it is preferable that retaining capacity of the dye is excellent. Therefore, it is preferable that a polyfunctional epoxy compound is added to a component that is responsible for hardness, such as a silane compound. Because the polyfunctional epoxy compound is further responsible for flexibility or cohesiveness, improvement of adhesiveness with the substrate or the antireflection layer on the hard coat layer is expected.

It is preferable that a porous silica fine particle and an organic silicon compound is included as a principal component in order to obtain a porous antireflection layer of the lens in accordance with the invention.

It is preferable that the antireflection layer of the lens in accordance with the invention includes from 40% by weight to 85% by weight of the porous silica fine particle, from 5% by weight to 60% by weight of the organic silicon compound, and up to 10% by weight of the polyfunctional epoxy compound. When the amount of the porous silica fine particle is too small, a porous layer to allow for dyeing of the lower layer can not be provided. To the contrary, when the amount of the porous silica fine particle is too high, an antireflection layer having sufficient hardness can not be obtained. It is preferable that the antireflection layer of the lens in accordance with the invention further includes a polyfunctional epoxy compound in a small amount. In the antireflection layer including a small amount of the polyfunctional epoxy compound, adhesiveness is improved.

It is preferable that the hard coat layer of the lens in accordance with the invention includes from 40% by weight to 70% by weight of rutile type titanium oxide as the metal oxide fine particle. The rutile type titanium oxide has a high refractive index similarly to titanium oxide that achieves a high refractive index of approximately 1.67. Meanwhile, the rutile type titanium oxide does not have a strong photocatalytic activity as anatase type titanium oxide and the like. Therefore, the hard coat layer including rutile type titanium oxide can provide a hard coat layer that achieves stable performances without decomposing organic matters such as a silane coupling agent (i.e., silane compound) which is another principal component of the hard coat layer. Also, the rutile type titanium oxide does not decompose a dye that is an organic matter. Accordingly, the hard coat layer including rutile type titanium oxide exhibits less color fading.

Examples of the polyfunctional epoxy compound used in the hard coat layer or the antireflection layer in accordance with the invention include, e.g., polyolefin based epoxy resins synthesized by a peroxidizing process; alicyclic epoxy resins such as polyglycidyl esters obtained from epichlorohydrin and cyclopentadiene oxide, cyclohexene oxide or hexahydrophthalic acid; polyglycidyl ethers obtained from epichlorohydrin and a polyhydric phenol such as bisphenol A, catechol or resocinol, or a polyhydric alcohol such as (poly)ethylene glycol, (poly)propylene glycol, neopentyl glycol, glycerol, trimethylolpropane, pentaerythritol, diglycerol or sorbitol; epoxidized vegetable oil; epoxynovolak obtained from a novolak phenol resin and epichlorohydrin; epoxy resins obtained from phenolphthalein and epichlorohydrin; copolymers of glycidylmethacrylate and methyl methacrylate acrylic monomer or styrene; as well as epoxy acrylates obtained by a glycidyl group ring-opening reaction of the above-referenced epoxy compound and monocarboxylic acid-containing (meth)acrylic acid.

Furthermore, examples of the polyfunctional epoxy compound include, for example, aliphatic epoxy compounds such as 1,6-hexanediol diglycidyl ether, ethylene glycol diglycidyl ether, diethylene glycol diglycidyl ether, triethylene glycol diglycidyl ether, tetraethylene glycol diglycidyl ether, nonaethylene glycol diglycidyl ether, propylene glycol diglycidyl ether, dipropylene glycol diglycidyl ether, tripropylene glycol diglycidyl ether, tetrapropylene glycol diglycidyl ether, nonapropylene glycol diglycidyl ether, neopentyl glycol diglycidyl ether, diglycidyl ether of neopentyl glycol hydroxypivalate ester, trimethylolpropane diglycidyl ether, trimethylolpropane triglycidyl ether, glycerol diglycidyl ether, glycerol triglycidyl ether, diglycerol diglycidyl ether, diglycerol triglycidyl ether, diglycerol tetraglycidyl ether, pentaerythritol diglycidyl ether, pentaerythritol triglycidyl ether, pentaerythritol tetraglycidyl ether, dipentaerythritol tetraglycidyl ether, sorbitol tetraglycidyl ether, diglycidyl ether of tris (2-hydroxyethyl)isocyanurate and triglycidyl ether of tris(2-hydroxyethyl) isocyanurate; alicyclic epoxy compounds such as isophorone diol diglycidyl ether and bis-2,2-hydroxycyclohexyl propane diglycidyl ether; aromatic epoxy compounds such as resorcin diglycidyl ether, bisphenol A diglycidyl ether, bisphenol F diglycidyl ether, bisphenol S diglycidyl ether, orthophthalate diglycidyl ester, phenol novolak polyglycidyl ether and cresol novolak polyglycidyl ether.

Examples of the metal oxide include, for example, antimony oxide coated titanium oxide-containing complex oxide sol dispersed in methanol; or fine particles or composite fine particles comprising at least one oxide of a metal selected from Si, Al, Sn, Sb, Ta, Ce, La, Fe, Zn, W, Zr, In and Ti; fine particles obtained by subjecting the outermost surface of metal oxide fine particles to a modifying treatment with an organic silicon compound; mixtures thereof included in the solid state or other complexed state. Titanium oxide may be either amorphous, or may be an anatase type, rutile type, brookite type or perovskite type titanium compound. Among them, the rutile type titanium oxide is most preferred.

The metal oxide is dispersed in a dispersant such as water, alcohol- or other organic solvent in a colloidal form. Also, the surface of the complex oxide fine particle may be treated with an organic silicon compound or an amine compound to permit modification. Examples of the organic silicon compound which may be used in this treatment include a monofunctional silane, a bifunctional silane, a trifunctional silane, a tetrafunctional silane and the like. Upon the treatment, the hydrolyzable group may be used either with further treatment or following hydrolysis. After the treatment, the hydrolyzable groups are preferably in the state of being reacted with —OH group of the fine particle. However, no problem is found in stability even though parts of them are in the state of left unchanged. Further, examples of the amine compound include, for example, ammonium, alkylamines such as ethylamine, triethylamine, isopropylamine and n-propylamine, aralkylamines such as benzylamine, alicyclic amines such as piperidine, alkanol amines such as monoethanolamine and triethanolamine. The organic silicon compound or the amine compound should be added in an amount of approximately from 1 to 15% per the weight of the fine particles. The organic silicon compound and the amine compound preferably have a particle size of about 1 to 300 mili micron.

It is preferable that the silane compound included in the hard coat layer or the antireflection layer is an organic silicon compound represented by the following general formula (A):

$$R_1(R_2)_n Si(X_1)_{3-n} \qquad (A)$$

wherein n is either 0 or 1.

Wherein $R_1$ is an organic group having a polymerizable reactive group or a hydrolyzable functional group. Specific examples of the polymerizable reactive group include, for example, a vinyl group, an allyl group, an acryl group, a methacryl group, an epoxy group, a mercapto group, a cyano group, an amino group and the like. Specific examples of the hydrolyzable functional group include alkoxy groups such as a methoxy group, an ethoxy group, and a methoxyethoxy group, halogen groups such as a chloro group, and a bromo group, and acyloxy groups.

$R_2$ is a hydrocarbon group having from 1 to 6 carbon atoms. Specific examples include a methyl group, an ethyl group, a butyl group, a vinyl group, a phenyl group and the like.

Moreover, $X_1$ is a hydrolyzable functional group, and examples thereof include, for example, alkoxy groups such as a methoxy group, an ethoxy group and a methoxyethoxy group, halogen groups such as a chloro group and a bromo group, and acyloxy groups.

Specific examples of $X_1$ include vinyltrialkoxysilane, vinyltrichlorosilane, vinyltri(β-methoxy-ethoxy)silane, allyltrialkoxysilane, acryloxypropyltrialkoxysilane, methacryloxypropyltrialkoxysilane, methacryloxypropyldialkoxymethylsilane, γ-glycidoxypropyltrialkoxysilane, β-(3,4-epoxycyclohexyl)-ethyltrialkoxysilane, mercaptopropyltrialkoxysilane, γ-aminopropyltrialkoxy silane, N-β-(aminoethyl)-γ-aminopropylmethyldialkoxysilane, tetramethoxysilane, γ-glycidoxypropyltrimethoxysilane. For $X_1$, two or more of these functional groups may be used as a mixture. Also, it is more efficacious that $X_1$ is used after being hydrolyzed.

As the dye, it is preferable that a disperse dye is used for suppressing uneven coloring. In the dyeing step, it is desired that dip dyeing is carried out in which the lens is dipped in a dye bath including the disperse dye allowed to be dispersed in water, thereby perfecting dyeing. It is preferable that the dye is highly fast. Examples of the dye which can be used include e.g., disperse dyes such as anthraquinone dyes, quinophtharone dyes, nitrodiphenylamine dyes and azo dyes. Specific examples of the disperse dye include benzene derivatives such as p-anisidine, aniline, p-aminoacetoanilide, p-aminophenol, 1-chloro-2,4-dinitrobenzene, 2-chloro-4-nitroaniline, o-chloronitrobenzene, diphenylamine, m-nitroaniline, p-nitroaniline, N,N-bis(2-hydroxyethyl)aniline, 1-phenyl-3-methyl-5-pyrazolone and phenol, toluene derivatives such as p-cresidine (6-methoxy-m-toluidine), m-cresol, p-cresol, m-toluidine, 2-nitro-p-toluidine and p-nitrotoluene, naphthalene derivatives such as 1-naphthylamine and 2-naphthol, phthalic anhydride, anthraquinone derivatives such as 1-amino-4-bromoanthraquinone-2-sulfonic acid (bromamine acid), 1-anthraquinonesulfonic acid, 1,4-diaminoanthraquinone, 1,5-dichloroanthraquinone, 1,4-dihydroxyanthraquinone(quinizarin), 1,5-dihydroxyanthraquinone(anthrarufin), 1,2,4-trihydroxyanthraquinone (purpurin) and 2-methylanthraquinone. Also, the disperse dye may be used alone or as a mixture of two or more thereof. The disperse dye is usually provided as a dye bath through dispersion in water. As the solvent, an organic solvent such as methanol, ethanol or benzyl alcohol may be used in addition to water.

Further, to the dye bath can be also added a surfactant as a dispersant for the dye. Examples of the surfactant include, for example, anionic surfactants such as alkylbenzene sulfonates, alkylnaphthalene sulfonates, alkylsulfosuccinates, aromatic sulfonic acid formalin condensates and lauryl sulfates, and nonionic surfactants such as polyoxyethylalkyl ethers, alkylamine ethers and polyoxyethylenesorbitan fatty acid esters. It is preferable that these surfactants are used in an amount of from 5 to 200% by weight of the amount of the used dye, depending on the density of the color of the lens. Dip dyeing is carried out by dispersing a disperse dye and a surfactant in water or a mixture of water and an organic solvent to prepare a dye bath, dipping a plastic lens into this dye bath, and dyeing at a predetermined temperature for a predetermined time. The temperature and time of dyeing may vary depending on the desired density of the color. In general, it may be carried out at 95° C. for from several to 30 minutes, with the dye density in the dye bath being preferably 0.01 to 5% by weight.

Components included in the hard coat layer are not limited to those as referenced above. For example, any additive can be used when the hard coat layer is formed, depending on needs in addition to the above-referenced components. Examples of the curing catalyst include, for example, perchloric acids such as perchloric acid, ammonium perchlorate and magnesium perchlorate, acetylacetonate having Cu (II), Zn (II), Co (II), Ni (II), Be (II), Ce (III), Ta (III), Ti (III), Mn (III), La (III), Cr (III), V (III), Co (III), Fe (III), Al (III), Ce (IV), Zr (IV), V (IV) or the like as a central metal atom, amines, amino acids such as glycine, Lewis acids, and organic acid metal salts. Among these, examples of the most preferable curing catalyst include magnesium perchlorate, acetylacetonate of Al (III) or Fe (III). Amount of addition is desirably within the range of from 0.01 to 5.0% by weight in the solid content concentration.

Moreover, a solvent and the like may be used in addition to the above-referenced components in the manufacturing process. Examples of the solvent which may be used for dilution include alcohols, esters, ketones, ethers, aromatic series and the like. Also, a small amount of a surfactant, an antistatic agent, a disperse dye, an oil soluble dye, a fluorescent dye, a pigment, a photochromic compound and the like may be added as needed to enable improvement of coating properties of the coating liquid for forming the layer, and coated film performances following curing.

Some of Examples and Comparative Examples of the present invention will be explained hereinbelow.

EXAMPLE 1

Primer Layer

Using a lens substrate for "Seiko Super Sovereign", manufactured by Seiko Epson Corporation, (hereinafter, abbreviated as SSV), a plastic lens base material with a refractive index of 1.67 was formed. On this plastic base material is formed a primer layer (undercoat layer) by a dipping method. Coating liquid P1 for forming the primer layer was prepared as follows. With 100 parts of a commercially available polyester resin "Pesresin A-160P" (manufactured by Takamatsu Oil Fat, Co., Ltd., emulsion dispersed in water, solid content concentration: 27%) were mixed 84 parts of rutile type titanium oxide complex sol (manufactured by Catalysts & Chemicals Ind. Co., Ltd., trade name: Optolake 1120Z), 640 parts of methyl alcohol as a diluting solvent, 1 part of a silicone surfactant (manufactured by Nippon Unicar Co., Ltd., trade name: "SILWET L-77") as a levelling agent. The mixture was stirred until a homogenous state is attained to give a coating liquid P1.

This coating liquid P1 was coated onto the lens base material by means of dipping with a pull-up rate of 15 cm per min. The lens base material after coating was air dried at 80° C. for 20 min to obtain a lens with a primer layer. After baking, the solid content of the primer layer obtained by film formation with the coating liquid P1 includes 62% by weight of the polyester resin and 38% by weight of the rutile type titanium oxide complex sol.

Hard Coat Layer

Coating liquid H1 for film formation of the hard coat layer was prepared as follows. After mixing 138 parts of propylene glycol methyl ether and 688 parts of rutile type titanium oxide complex sol (manufactured by Catalysts & Chemicals Ind. Co., Ltd., trade name: Optolake 1120Z), therewith were mixed 106 parts of γ-glycidoxypropyltrimethoxysilane and 38 parts of glycerol polyglycidyl ether (manufactured by Nagase Chemicals, Ltd, trade name: Denacol EX313) to give a mixture. To this mixture was added dropwise 30 parts of a 0.1 N aqueous hydrochloric acid solution while stirring. Thus resulting mixture was further stirred for 4 hrs, and then aged for a whole day and night. Thereafter, to this mixture were added 1.8 parts of Fe (III) acetylacetonate and 0.3 part of a silicone surfactant (manufactured by Nippon Unicar Co., Ltd., trade name: L-7001) to obtain the coating liquid H1.

This coating liquid H1 was coated onto the lens with the primer layer by means of dipping with a pull-up rate of 35 cm per min. After coating, the lens was air dried at 80° C. for 30 min, and further baked at 120° C. for 120 min to obtain a lens with a hard coat layer having a thickness of 2.3 μm. The hard coat layer obtained by film formation contains glycerol polyglycidyl ether that is a polyfunctional epoxy compound, and is a dyeable hard coat layer.

After baking, the solid content of the hard coat layer obtained by film formation with the coating liquid H1 includes 55% by weight of the metal oxide fine particles (rutile type titanium oxide complex sol), 30% by weight of the organic silicon (γ-glycidoxypropyltrimethoxysilane) and 15% by weight of the polyfunctional epoxy compound (glycerol polyglycidyl ether).

Antireflection Layer

Coating liquid (liquid with low refraction) AR1 for film formation of the antireflection layer was prepared as follows. To a mixture of 14 parts of γ-glycidoxypropyltrimethoxysilane and 15 parts of tetramethoxysilane was added dropwise 13 parts of a 0.1 N aqueous hydrochloric acid solution while stirring. Thus resulting mixture was further stirred for 4 hrs, and then aged for a whole day and night to obtain a mixture. To this mixture were added 878 parts of propylene glycol methyl ether, 80 parts of hollow silica sol (manufactured by Catalysts & Chemicals Ind. Co., Ltd., trade name: Oscal special item), 0.04 part of magnesium perchlorate and 0.3 part of a silicone surfactant (manufactured by Nippon Unicar Co., Ltd., trade name: L-7001) to obtain the coating liquid AR1.

Before forming the antireflection layer with this coating liquid AR1, lens surface (surface of the hard coat layer) was subjected to a plasma treatment to provide hydrophilicity. Thereafter, the coating liquid AR1 was coated onto the lens with the hard coat layer by means of a wet process (i.e., dipping) with a pull-up rate of 15 cm per min. After coating, the lens was air dried at 80° C. for 30 min, and further baked at 120° C. for 60 min to obtain a lens with a porous antireflection layer (film with low refraction) having a thickness of about 100 nm.

After baking, the solid content of the antireflection layer obtained by film formation with the coating liquid AR1 includes 25% by weight of γ-glycidoxypropyltrimethoxysilane, 15% by weight of tetramethoxysilane and 60% by weight of the hollow silica sol. This antireflection layer does not contain a polyfunctional epoxy compound (glycerol polyglycidyl ether).

Water Repellent Layer

Furthermore, surface of this lens with the antireflection layer was subjected to a water repellent treatment with a fluorine silane compound to obtain a lens with a water repellent coating.

Dyeing

In this Example, the thus manufactured lens with the water repellent coating was dipped into a 94° C. disperse dye bath for 10 min to carry out dyeing. As the disperse dye, for example, a dyeing agent amber D for Seiko Plux Diamond Coat can be used. The thus resulting dyed lens was tested as described below to check each performance. The test and results thereof will be later explained all together.

EXAMPLE 2

Hard Coat Layer

Coating liquid H2 for film formation of the hard coat layer was prepared as follows. After mixing 147 parts of propylene glycol methyl ether and 688 parts of rutile type titanium oxide complex sol (manufactured by Catalysts & Chemicals Ind. Co., Ltd., trade name: Optolake 1120Z) first, therewith were mixed 88 parts of γ-glycidoxypropyltrimethoxysilane and 50 parts of glycerol polyglycidyl ether (manufactured by Nagase Chemicals, Ltd, trade name: Denacol EX313) to give a mixture. To this mixture was added dropwise 24 parts of a 0.1 N aqueous hydrochloric acid solution while stirring. The thus resulting mixture was further stirred for 4 hrs, and then aged for a whole day and night. Thereafter, to this mixture were added 0.6 part of magnesium perchlorate, 1.9 parts of Fe (III) acetylacetonate and 0.3 part of a silicone surfactant (manufactured by Nippon Unicar Co., Ltd., trade name: L-7001) to obtain the coating liquid H2.

This coating liquid H2 was coated onto a lens substrate (SSV, lens without primer layer) by means of dipping with a pull-up rate of 35 cm per min. After coating, the lens was air dried at 80° C. for 30 min, and further baked at 120° C. for 120 min to obtain a lens with a hard coat layer having a thickness of 2.3 μm.

After baking, the solid content of the hard coat layer obtained by film formation with the coating liquid H2 includes 55% by weight of the metal oxide fine particles (rutile type titanium oxide complex sol), 25% by weight of the organic silicon (γ-glycidoxypropyltrimethoxysilane) and 20% by weight of the polyfunctional epoxy compound (glycerol polyglycidyl ether).

Antireflection Layer

Next, this lens surface was subjected to a plasma treatment to provide hydrophilicity. Then, the coating liquid AR1 for film formation of the antireflection layer that is the same as in Example 1 was coated onto the lens with the hard coat layer by means of dipping with a pull-up rate of 15 cm per min. After coating, the lens was air dried at 80° C. for 30 min, and further baked at 120° C. for 60 min to obtain a lens with an antireflection layer having a thickness of about 100 nm.

Water Repellent Layer

Furthermore, this lens with the antireflection layer was subjected to a water repellent treatment with a fluorine silane compound to obtain a lens with a water repellent layer.

Dyeing

The lens with the water repellent layer was dipped into a 94° C. disperse dye bath for 10 min to carry out dyeing. The dyed lens thus manufactured was tested as described below to check each performance.

EXAMPLE 3

Hard Coat Layer

Coating liquid H3 for film formation of the hard coat layer was prepared as follows. After mixing 156 parts of propylene glycol methyl ether and 688 parts of rutile type titanium oxide complex sol (manufactured by Catalysts & Chemicals Ind. Co., Ltd., trade name: Optolake 1120Z), therewith were mixed 71 parts of γ-glycidoxypropyltrimethoxysilane and 63 parts of glycerol polyglycidyl ether (manufactured by Nagase Chemicals, Ltd, trade name: Denacol EX313) to give a mixture. To this mixture was added dropwise 20 parts of a 0.1 N aqueous hydrochloric acid solution while stirring. Thus resulting mixture was further stirred for 4 hrs, and then aged for a whole day and night. Thereafter, to this mixture were added 4 parts of Fe (III) acetylacetonate and 0.3 part of a silicone surfactant (manufactured by Nippon Unicar Co., Ltd., trade name: L-7001) to obtain the coating liquid H3.

This coating liquid H3 was coated onto a lens substrate (SSV, lens without primer layer) by means of dipping with a pull-up rate of 35 cm per min. After coating, the lens was air dried at 80° C. for 30 min, and further baked at 120° C. for 120 min to obtain a lens with a hard coat layer having a thickness of 2.5 μm.

After baking, the solid content of the hard coat layer obtained by film formation with the coating liquid H3 includes 55% by weight of the metal oxide fine particles (rutile type titanium oxide complex sol), 20% by weight of the organic silicon (γ-glycidoxypropyltrimethoxysilane) and 25% by weight of the polyfunctional epoxy compound (glycerol polyglycidyl ether).

Antireflection Layer

Coating liquid AR2 for film formation of the antireflection layer was prepared as follows. To a mixture of 14 parts of γ-glycidoxypropyltrimethoxysilane and 15 parts of tetramethoxysilane was added dropwise 13 parts of a 0.1 N aqueous hydrochloric acid solution while stirring. The thus resulting mixture was further stirred for 4 hrs, and then aged for a whole day and night to obtain a mixture. To this mixture were added 883 parts of propylene glycol methyl ether, 73 parts of hollow silica sol (manufactured by Catalysts & Chemicals Ind. Co., Ltd., trade name: Oscal special item), 2 parts of glycerol polyglycidyl ether (manufactured by Nagase Chemicals, Ltd, trade name: Denacol EX313), 0.07 part of magnesium perchlorate and 0.3 part of a silicone surfactant (manufactured by Nippon Unicar Co., Ltd., trade name: L-7001) to obtain the coating liquid AR2.

Before forming the antireflection layer (film formation), surface of the hard coat layer was subjected to a plasma treatment to provide hydrophilicity. Thereafter, the coating liquid AR2 was coated onto the lens with the hard coat layer by means of dipping with a pull-up rate of 15 cm per min. After coating, the lens was air dried at 80° C. for 30 min, and thereafter, further baked at 120° C. for 120 min to obtain a lens with an antireflection layer having a thickness of about 100 nm.

After baking, the solid content of the antireflection layer obtained by film formation with the coating liquid AR2 includes 25% by weight of γ-glycidoxypropyltrimethoxysilane, 15% by weight of tetramethoxysilane and 55% by weight of the hollow silica sol. Further, 5% by weight of the polyfunctional epoxy compound (glycerol polyglycidyl ether) is included.

Water Repellent Layer

Surface of this lens with the antireflection layer was subjected to a water repellent treatment with a fluorine silane compound to obtain a lens with a water repellent layer.

Dyeing

The lens with the water repellent layer was dipped into a 94° C. disperse dye bath for 10 min to carry out dyeing. The dyed lens thus manufactured was tested as described below to check each performance.

EXAMPLE 4

Hard Coat Layer

Coating liquid H4 for film formation of the hard coat layer was prepared as follows. After mixing 207 parts of propylene glycol methyl ether and 625 parts of rutile type titanium oxide complex sol (manufactured by Catalysts & Chemicals Ind. Co., Ltd., trade name: Optolake 1120Z), therewith were mixed 71 parts of γ-glycidoxypropyltrimethoxysilane and 75 parts of glycerol polyglycidyl ether (manufactured by Nagase Chemicals, Ltd, trade name: Denacol EX313) to give a mixture. To this mixture was added dropwise 20 parts of a 0.1 N aqueous hydrochloric acid solution while stirring. The thus resulting mixture was further stirred for 4 hrs, and then aged for a whole day and night. Thereafter, to this mixture were added 2.3 parts of Fe (III) acetylacetonate and 0.3 part of a silicone surfactant (manufactured by Nippon Unicar Co., Ltd., trade name: L-7001) to obtain the coating liquid H4.

This coating liquid H4 was coated onto a lens substrate (SSV, lens without a primer layer) by means of dipping with a pull-up rate of 35 cm per min. After coating, the lens was air dried at 80° C. for 30 min, and further baked at 120° C. for 120 min to obtain a lens with a hard coat layer having a thickness of 2.5 μm.

After baking, the solid content of the hard coat layer obtained by film formation with the coating liquid H4 includes 50% by weight of the metal oxide fine particles (rutile type titanium oxide complex sol), 20% by weight of the organic silicon (γ-glycidoxypropyltrimethoxysilane) and 30% by weight of the polyfunctional epoxy compound (glycerol polyglycidyl ether).

Antireflection Layer

Next, this lens surface was subjected to a plasma treatment to provide hydrophilicity. Then, the coating liquid AR2 for film formation of the antireflection layer that is the same as in Example 3 was coated onto the lens with the hard coat layer by means of dipping with a pull-up rate of 15 cm per min. After coating, the lens was air dried at 80° C. for 30 min, and further baked at 120° C. for 120 min to obtain a lens with an antireflection layer having a thickness of about 100 nm.

Water Repellent Layer

This lens with the antireflection layer was subjected to a water repellent treatment with a fluorine silane compound to obtain a lens with a water repellent layer.

Dyeing

This lens with the water repellent layer was dipped into a 94° C. disperse dye bath for 10 min to carry out dyeing. The dyed lens thus manufactured was tested as described below to check each performance.

EXAMPLE 5

Hard Coat Layer

Coating liquid H5 for film formation of the hard coat layer was prepared as follows. After mixing 162 parts of propylene glycol methyl ether and 625 parts of rutile type titanium oxide complex sol (manufactured by Catalysts & Chemicals Ind. Co., Ltd., trade name: Optolake 1120Z), therewith were mixed 53 parts of γ-glycidoxypropyltrimethoxysilane, 35 parts of 3-methacryloxypropyltrimethoxysilane, 32 parts of tetramethoxysilane and 50 parts of 1,6-hexanediol diglycidyl ether (manufactured by Nagase ChemteX Corporation, trade name: "Denacol EX-212") to give a mixture. To this mixture was added dropwise 43 parts of a 0.1 N aqueous hydrochloric acid solution while stirring. The thus resulting mixture was further stirred for 4 hrs, and then aged for a whole day and night. Thereafter, to this mixture were added 1.8 parts of Al (III) acetylacetonate and 0.3 part of a silicone surfactant (manufactured by Nippon Unicar Co., Ltd., trade name: L-7001) to obtain the coating liquid H5.

This coating liquid H5 was coated onto the lens with the primer layer by means of dipping with a pull-up rate of 35 cm per min. After coating, the lens was air dried at 80° C. for 30 min, and further baked at 120° C. for 120 min to obtain a lens with a hard coat layer having a thickness of 2.3 μm.

After baking, the solid content of the hard coat layer obtained by film formation with the coating liquid H5 includes 50% by weight of the metal oxide fine particles (rutile type titanium oxide complex sol), 30% by weight of the organic silicon (γ-glycidoxypropyltrimethoxysilane, 3-methacryloxypropyltrimethoxysilane, tetramethoxysilane) and 20% by weight of the polyfunctional epoxy compound (1,6-hexanediol diglycidyl ether).

Antireflection Layer

Next, this lens surface was ground with a mixture of cerium oxide fine particles and water. Then, the coating liquid AR1 for film formation of the antireflection layer that is the same as in Example 1 was coated onto the lens with the hard coat layer by means of dipping with a pull-up rate of 15 cm per min. After coating, the lens was air dried at 80° C. for 30 min, and further baked at 120° C. for 60 min to obtain a lens with an antireflection layer having a thickness of about 100 nm.

Water Repellent Layer

Furthermore, this lens with the antireflection layer was subjected to a water repellent treatment with a fluorine silane compound to obtain a lens with a water repellent layer.

Dyeing

The lens with the water repellent layer was dipped into a 94° C. disperse dye bath for 10 min to carry out dyeing. The dyed lens thus manufactured was tested as described below to check each performance.

EXAMPLE 6

Hard Coat Layer

Coating liquid H6 for film formation of the hard coat layer was prepared as follows. After mixing 139 parts of propylene glycol methyl ether and 688 parts of rutile type titanium oxide complex sol (manufactured by Catalysts & Chemicals Ind. Co., Ltd., trade name: Optolake 1120Z), therewith were mixed 88 parts of γ-glycidoxypropyltrimethoxysilane, 17 parts of 3-methacryloxypropyltrimethoxysilane and 38 parts of glycerol triglycidyl ether (manufactured by Nagase ChemteX Corporation, trade name: "Denacol EX-314") to give a mixture. To this mixture was added dropwise 29 parts of a 0.1 N aqueous hydrochloric acid solution while stirring. The thus resulting mixture was further stirred for 4 hrs, and then aged for a whole day and night. Thereafter, to this mixture were added 1.8 parts of Al (III) acetylacetonate, 1.1 parts of magnesium perchlorate and 0.3 part of a silicone surfactant (manufactured by Nippon Unicar Co., Ltd., trade name: L-7001) to obtain the coating liquid H6.

This coating liquid H6 was coated onto the lens with the primer layer by means of dipping with a pull-up rate of 35 cm per min. After coating, the lens was air dried at 80° C. for 30 min, and further baked at 120° C. for 120 min to obtain a lens with a hard coat layer having a thickness of 2.2 μm.

After baking, the solid content of the hard coat layer obtained by film formation with the coating liquid H6 includes 55% by weight of the metal oxide fine particles (rutile type titanium oxide complex sol), 30% by weight of the organic silicon (γ-glycidoxypropyltrimethoxysilane, 3-methacryloxypropyltrimethoxysilane) and 15% by weight of the polyfunctional epoxy compound (glycerol triglycidyl ether).

Antireflection Layer

Next, this lens surface was ground with a mixture of cerium oxide fine particles and water. Then, the coating liquid AR2 for film formation of the antireflection layer that is the same as in Example 3 was coated onto the lens with the hard coat layer by means of dipping with a pull-up rate of 15 cm per min. After coating, the lens was air dried at 80° C. for 30 min, and further baked at 120° C. for 60 min to obtain a lens with an antireflection layer having a thickness of about 100 nm.

Water Repellent Layer

Furthermore, this lens with the antireflection layer was subjected to a water repellent treatment with a fluorine silane compound to obtain a lens with a water repellent layer.

Dyeing

The lens with the water repellent layer was dipped into a 94° C. disperse dye bath for 10 min to carry out dyeing. The dyed lens thus manufactured was tested as described below to check each performance.

COMPARATIVE EXAMPLE 1

Primer Layer and Hard Coat Layer

A primer layer was similarly formed on a substrate similar to that in Example 1 (SSV), with the coating liquid P1 for film formation of the primer layer by the same treatment to obtain a lens with a primer layer. On this lens with the primer layer was formed a hard coat layer using the coating liquid H1 for film formation of the hard coat layer that is the same as in Example 1 by the same treatment to obtain a lens with a hard coat layer.

Antireflection Layer

Coating liquid AR3 for film formation of the antireflection layer was prepared as follows. To a mixture of 25 parts of γ-glycidoxypropyltrimethoxysilane and 25 parts of tetramethoxysilane was added dropwise 21 parts of a 0.1 N aqueous hydrochloric acid solution while stirring. The thus resulting mixture was further stirred for 4 hrs, and then aged for a whole day and night to obtain a mixture. To this mixture were added 889 parts of propylene glycol methyl ether, 40 parts of hollow silica sol (manufactured by Catalysts & Chemicals Ind. Co., Ltd., trade name: Oscal special item), 0.08 part of magnesium perchlorate and 0.3 part of a silicone surfactant (manufactured by Nippon Unicar Co., Ltd., trade name: L-7001) to obtain the coating liquid AR3.

Before film formation of the antireflection layer, surface of the hard coat layer of the lens with the hard coat layer was subjected to a plasma treatment to provide hydrophilicity. Then, the coating liquid AR3 for forming the antireflection layer was coated onto the lens with the hard coat layer by means of dipping with a pull-up rate of 15 cm per min. After coating, the lens was air dried at 80° C. for 30 min, and further baked at 120° C. for 60 min to obtain a lens with an antireflection layer having a thickness of about 100 nm.

After baking, the solid content of the antireflection layer obtained by film formation with the coating liquid AR3 includes 45% by weight of γ-glycidoxypropyltrimethoxysilane, 25% by weight of tetramethoxysilane and 30% by weight of the hollow silica sol. This antireflection layer does not contain a polyfunctional epoxy compound (glycerol polyglycidyl ether).

Water Repellent Layer

Surface of this lens with the antireflection layer was subjected to a water repellent treatment with a fluorine silane compound to obtain a lens with a water repellent layer.

Dyeing

This lens with the water repellent layer was dipped into a 94° C. disperse dye bath for 10 min to carry out dyeing. The dyed lens thus manufactured was tested as described below to check each performance.

COMPARATIVE EXAMPLE 2

Primer Layer

A primer layer was formed (film formation) on a substrate similar to that in Example 1 (SSV), with the coating liquid P1 that executes film formation of a similar primer layer by the same treatment to obtain a lens with a primer layer.

Hard Coat Layer

Coating liquid H5 for film formation of the hard coat layer was prepared as follows. After mixing 69 parts of propylene glycol methyl ether and 750 parts of rutile type titanium oxide complex sol (manufactured by Catalysts & Chemicals Ind. Co., Ltd., trade name: Optolake 1120Z), therewith was mixed 141 parts of γ-glycidoxypropyltrimethoxysilane to obtain a mixture. To this mixture was added dropwise 39 parts of a 0.1 N aqueous hydrochloric acid solution while stirring. The thus resulting mixture was further stirred for 4 hrs, and then aged for a whole day and night. Thereafter, to this mixture were added 0.4 part of magnesium perchlorate and 0.3 part of a silicone surfactant (manufactured by Nippon Unicar Co., Ltd., trade name: L-7001) to obtain the coating liquid H5.

This coating liquid H5 was coated onto the lens with the primer layer by means of dipping with a pull-up rate of 35 cm per min. After coating, the lens was air dried at 80° C. for 30 min, and further baked at 120° C. for 120 min to obtain a lens with a hard coat layer having a thickness of 2.1 μm.

After baking, the solid content of the hard coat layer obtained by film formation with the coating liquid H5 includes 60% by weight of the metal oxide fine particles (rutile type titanium oxide complex sol) and 40% by weight of the organic silicon (γ-glycidoxypropyltrimethoxysilane), and does not contain a polyfunctional epoxy compound.

Antireflection Layer

After subjecting the surface of the hard coat layer of this lens with the hard coat layer to a plasma treatment to provide hydrophilicity, the coating liquid AR1 for film formation of the antireflection layer that is the same as in Example 1 was coated onto the lens with the hard coat layer by means of dipping with a pull-up rate of 15 cm per min. After coating, the lens was air dried at 80° C. for 30 min, and further baked at 120° C. for 60 min to obtain a lens with an antireflection layer having a thickness of about 100 nm.

Water Repellent Layer

Furthermore, this lens with the antireflection layer was subjected to a water repellent treatment with a fluorine silane compound to obtain a lens with a water repellent layer.

Dyeing

This lens with the water repellent layer was dipped into a 94° C. disperse dye bath for 10 min to carry out dyeing. The dyed lens thus manufactured was tested as described below to check each performance.

Test and Evaluation

Using the lenses manufactured according to Examples 1 to 6, and the dyed lenses manufactured according to Comparative Examples 1 and 2 as a test subject, tests and evaluations were carried out on dyeing affinity, heat resistance, antireflection effect, adhesiveness and abrasion resistance. The results are summarized in FIG. 1.

Dyeing affinity, dyeing density and unevenness of dyeing of the dyed lens were visually evaluated. Specifically, extent of color unevenness was graded by visual observation. "A" denotes that color unevenness is absent, and dyeing could be perfected to have sufficient density; "B" denotes that color unevenness is absent, but the density is insufficient; "C" denotes that color unevenness is prominent, or the dyeing density is insufficient; and "D" denotes that color unevenness is marked, or the dyeing is impossible.

Heat resistance is evaluated by measuring the temperature to cause a crack. Specifically, the test subject lens was fitted in a predetermined spectacle frame, and thereafter placed in a 40° C. oven with the spectacle frame to heat for 30 min. After removing the lens with the spectacle frame from the oven, it is allowed to stand at room temperature for 30 min, and generation of a crack on the lens is visually evaluated using a dark box. In case where no crack is generated, temperature of the oven was elevated stepwise by 10° C. each step, and again the test subject lens was heated with the frame for 30 min. Thereafter, the lens is removed from the oven to evaluate similarly as described above. Temperature of the oven is elevated up to 100° C. to carry out the test with a temperature pitch of 10° C. The temperature at which generation of a severe crack was found during the test is designated as a crack generation temperature. In the evaluation standards of this heat resistance test, "A" denotes that the crack generation temperature is 100° C., or no crack is generated even at 100° C., suggesting the heat resistance being extremely great. "B" denotes that the crack generation temperature is 80° C. to 90° C., suggesting the heat resistance being great. "D" denotes that the crack generation temperature is not higher than 70° C., suggesting the heat resistance being inferior.

The antireflection effect was evaluated through measuring surface reflectance of the test subject lens with a spectrophotometer (Hitachi, Ltd., U-3500). Mean reflectance (one face) in the visible light range (400 nm to 800 nm) was measured with the spectrophotometer. In the evaluation standards of this antireflection effect, "A" denotes that the mean reflectance is not greater than 2%, suggesting the antireflection effect being extremely superior. "B" denotes that the mean reflectance is not greater than 3.5%, suggesting the presence of satisfactory antireflection effect. "D" denotes that the mean reflectance is greater than 3.5%, suggesting the antireflection effect being scarcely present.

In order to evaluate adhesiveness, the test subject lens is first exposed to a sunshine weather (with a sunshine weather meter by a xenon lamp for 120 hrs). Further, the lens was allowed to stand in a constant temperature and humidity condition (constant temperature and humidity chamber, in an atmosphere of 60° C.×99% for 7 days). Then, adhesiveness between the lens substrate and the surface treatment layer (primer layer (limited to those formed therewith), the hard coat layer and the antireflection layer) was evaluated in these test subject lenses. Specifically, cross-cut tape test according to JIS D-0202 was carried out on the test subject lens. In the crosscut tape test, the base material surface of each lens is incised at intervals of 1 mm using a knife, thereby forming a grid with 100 squares of 1 mm2. Next, a cellophane adhesive tape (manufactured by Nichiban Co., Ltd., trade name: "Cellotape (registered trademark)") is strongly pressed thereon, and then rapidly pulled toward a 90 degree vertical direction from the surface to strip off. Thereafter, the grid with the coated film (surface treatment layer) left is visually observed as a marker of the adhesiveness. In the evaluation standards of adhesiveness, "A" denotes that area of the part with the coated film left is 100%, suggesting the adhesiveness being extremely high; "B" denotes that area of the part with the coated film left is not less than 95% and less than 100%, suggesting the adhesiveness being high; "C" denotes that area of the part with the coated film left is not less than 50% and less than 95%, suggesting the adhesiveness being somewhat inferior; and "D" denotes that area of the part with the coated film left is less than 50%, suggesting the adhesiveness being inferior.

For evaluation of abrasion resistance, surface of the dyed test subject lens is frictionized through rubbing reciprocatingly 10 times with Bonstar #0000 Steel Wool (manufactured by Japan Steel Wool Co., Ltd.) while applying a load of 1 kg. Then, degree of scratching is visually observed. In the evaluation standards of this abrasion resistance, degree of scratching is graded into 10 ranks (1 (bad) to 10 (good)) by visual observation. "A" falls within the ranks of 10 to 8, suggesting the abrasion resistance being extremely superior; "B" falls within the ranks of 7 to 6, suggesting the abrasion resistance being superior; "C" falls within the ranks of 5 to 4, suggesting the abrasion resistance being somewhat inferior; and "D" falls within the ranks of 3 to 1, suggesting the abrasion resistance being inferior.

As is clear from FIG. 1, the dyed lenses manufactured in Examples 1 to 6 exhibited results of "A" in all evaluations of dyeing affinity, heat resistance, antireflection effect, adhesiveness and abrasion resistance. Therefore, it was revealed that they are lenses having extremely favorable dyeing affinity, and extremely favorable abrasion resistance as well. In addition, it was also revealed that they are dyed lenses in which both durability performances and coloring performances can be simultaneously achieved. Therefore, these experiments proved that a lens that can be dyed after formation of an antireflection layer and a water repellent layer can be obtained.

The dyed lenses manufactured by Comparative Example 1 and Comparative Example 2 exhibited results showing inferior dyeing affinity. In the lens of Comparative Example 1, it is believed that the antireflection layer could not sufficiently permeate the dye due to insufficient porosity because hollow silica sol included in the coating liquid AR3 of the antireflection layer is 30% by weight. Also, because of lack of hollow silica sol, sufficiently low power of the antireflection layer is not achieved, and in addition, the antireflection effect is not superior. In the lens of Comparative Example 2, it is believed that dyeing could not be perfected due to low dyeing affinity of the hard coat layer because the polyfunctional epoxy compound is not included in the coating liquid H5 of the hard coat layer. Additionally, deteriorated adhesiveness is found due to lack of the polyfunctional epoxy compound.

Accordingly, as a lens capable of being dyed following formation of a hard coat layer and an antireflection layer, and further a water repellent layer on a lens base material, it is desired that the antireflection layer includes a porous silica fine particle of from 40% by weight to 85% by weight, an organic silicon compound of from 5% by weight to 60% by weight, and a polyfunctional epoxy compound of up to 10% by weight. Moreover, it is further desired that the porous silica fine particle is included in an amount of from 60% by weight to 80% by weight, and the organic silicon compound is included in an amount of from 20% by weight to 40% by weight.

Further, it is desired that the hard coat layer includes a rutile type titanium oxide fine particle of from 40% by weight to 70% by weight, and more preferably, it is included in an amount of from 50% by weight to 60% by weight.

It is desired that the primer layer includes a polyester resin in an amount of from 20% by weight to 80% by weight and a rutile type titanium oxide fine particle in an amount of from 20% by weight to 80% by weight, and more preferably, in an amount of from 40% by weight to 60% by weight.

Hereinabove, explanation was made with reference to a plastic lens as an example of the substrate, however, similar effect can be also accomplished in case of glass lenses. Moreover, a plastic lens for use in spectacles was manufactured as a dyed lens, and evaluations of its dyeing affinity, as well as adhesiveness and durability such as abrasion resistance in the foregoings were made. However, the dyed lens (optical element) to which the invention is applicable is not limited to spectacle lenses, but may be lenses for cameras. Moreover, the invention is also applicable to other optical elements, for example, prisms and the like.

What is claimed is:

1. A plastic lens comprising:
   a lens base material that is plastic,
   a dyed hard coat layer laminated on the lens base material directly or via a primer layer, and
   a porous antireflection layer laminated on the hard coat layer wherein the antireflection layer includes a hollow silica fine particle and an organic silicon compound as a principle component, the organic silicon compound represented by the following general formula (A):

$R^1R^2{}_nSiX^1{}_{3-n}$ wherein n is either 0 or 1,
   said dyed hard coat layer being dyed via the antireflection layer.

2. The lens according to claim 1, wherein the dyed hard coat layer includes rutile titanium oxide.

3. A method of manufacturing a lens comprising:
   forming a dyeable hard coat layer on a lens base material directly, or via a primer layer,
   forming a porous antireflection layer on the dyeable hard coat layer, and
   after forming the porous antireflection layer, dyeing the dyeable hard coat layer via the antireflection layer, wherein the dyeable hard coat layer includes a metal oxide fine particle, an organic silicon compound and a polyfunctional epoxy compound, and
   the antireflection layer includes a hollow silica fine particle and a second organic silicon compound,
   the second organic silicon compound represented by the following general formula (A):

$R^1R^2{}_nSiX^1{}_{3-n}$ wherein n is either 0 or 1.

4. The method of manufacturing a lens according to claim 3, wherein the antireflection layer includes a second polyfunctional epoxy compound, and wherein the antireflection layer includes from 40% by weight to 85% by weight of the hollow silica fine particle, from 5% by weight to 60% by weight of the second organic silicon compound, and up to 10% by weight of the second polyfunctional epoxy compound, based on the solid content of the antireflection layer.

5. The method of manufacturing a lens according to claim 3, wherein the dyeable hard coat layer includes from 40% by weight to 70% by weight of rutile type titanium oxide as the metal oxide fine particle, based on the solid content of the dyeable hard coat layer.

* * * * *